C. SJÖGREN.
VEHICLE WHEEL.
APPLICATION FILED OCT. 30, 1917.
1,259,147. Patented Mar. 12, 1918.
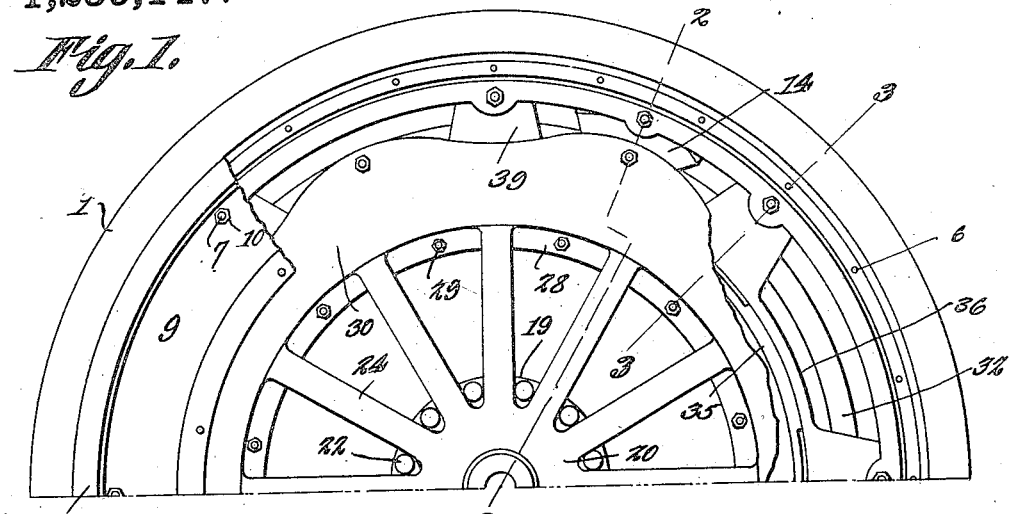
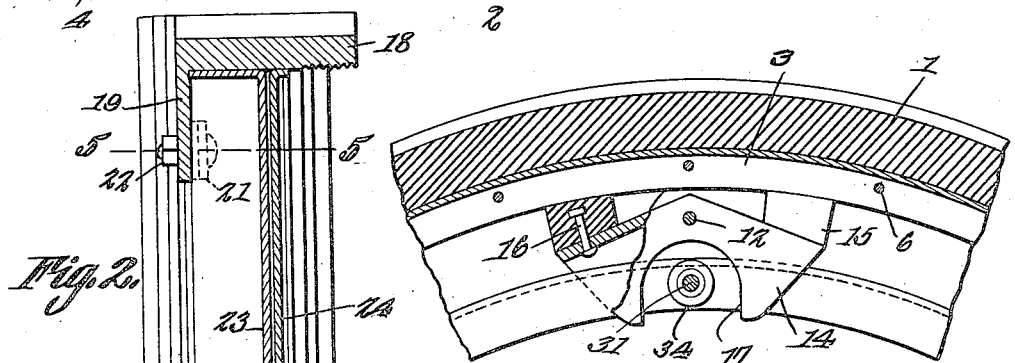
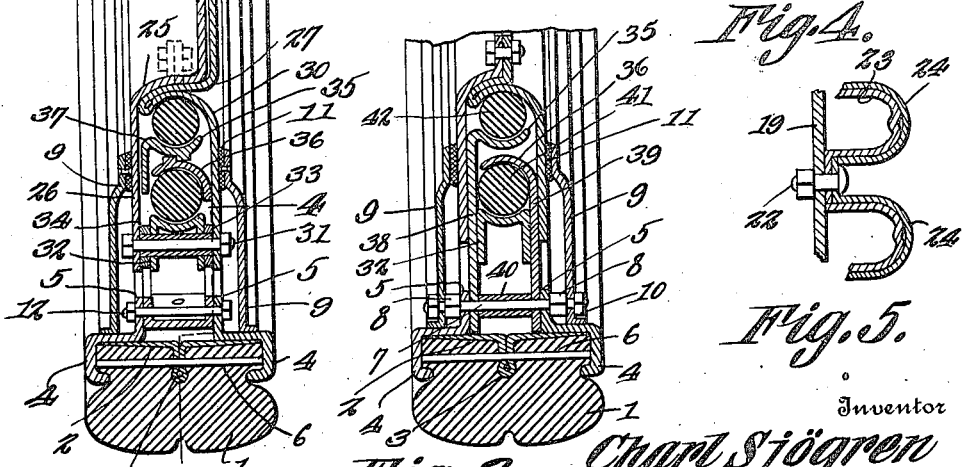
Inventor
Charl Sjögren

UNITED STATES PATENT OFFICE.

CHARL SJÖGREN, OF WESSINGTON SPRINGS, SOUTH DAKOTA.

VEHICLE-WHEEL.

1,259,147.

Specification of Letters Patent.  Patented Mar. 12, 1918.

Application filed October 30, 1917.  Serial No. 199,321.

*To all whom it may concern:*

Be it known that I, CHARL SJÖGREN, a citizen of the United States, residing at Wessington Springs, in the county of Jerauld and State of South Dakota, have invented a new and useful Vehicle-Wheel, of which the following is a specification.

The device forming the subject matter of this application is a vehicle wheel, and the invention aims to provide novel means whereby the necessary resiliency is afforded in the wheel, without undue side play.

It is within the province of the disclosure to improve generally and to enhance the utility of devices of that type to which the present invention appertains.

With the above and other objects in view which will appear as the description proceeds the invention resides in the combination and arrangement of parts and in the details of construction hereinafter described and claimed it being understood that changes in the precise embodiment of the invention herein disclosed can be made within the scope of what is claimed without departing from the spirit of the invention.

In the accompanying drawings:—

Figure 1 shows in side elevation, a portion of a wheel constructed in accordance with the present invention, parts being broken away;

Fig. 2 is a section on the line 2—2 of Fig. 1;

Fig. 3 is a section on the line 3—3 of Fig. 1;

Fig. 4 is a section on the line 4—4 of Fig. 2; and

Fig. 5 is a section on the line 5—5 of Fig. 2.

The numeral 1 indicates a tire made of any suitable material, such as rubber or rubber compound. A base ring 2, which may be of metal, extends around the inner curve of the tire 1. The base ring 2 has an intermediate rib 3 which projects outwardly into the tire 1. The tire 1 is engaged laterally by a pair of rim members 4. The rim members 4 extend toward the median plane of the wheel, to engage the ring 2, and are provided with inwardly projecting parallel flanges 5. Pins 6 pass through the tire 1 and through the rib 3. The pins 6 hold the base member 2 on the tire 1. They also prevent the rim members 4 from approaching each other too closely, and serve to hold the flanges 5 in spaced parallel relation. The flanges 5 are united by means of bolts 7. Nuts 8 are threaded on bolts 7. The nuts 8 engage the lateral faces of the flanges 5 and hold the rim members 4 on the tire 1. Annular side guards 9 abut at their outer edges against the rim members 4. The bolts 7 pass through the side guards 9. Nuts 10 are threaded on the bolts 7 and hold the side guards 9 in place. The side guards 9 are supplied adjacent their inner edges with friction rings 11 which may be made of fiber or a like substance.

Bolts 12 are mounted in the flanges 5 of the rim members 4. Rockers 14 are mounted, intermediate their ends, to tilt on the bolts 12. The rockers 14 extend circumferentially of the wheel. Resilient blocks 15 are attached by securing elements 16 to the rockers 14 adjacent the ends of the rockers. The blocks 15 bear on the base ring 2. The rockers 14 are of trough shape in cross section. Notches 17 are formed in the side walls of the rockers 14.

The numeral 18 denotes a hub having a side wall 19. Hub plates 20 are mounted on the hub 18 and have coacting tongues 21 united by securing elements 22 to the side wall 19. The hub plates 20 have coacting spoke forming parts 23 and 24. The spoke parts 23 are extended laterally to form a ledge 25 and are extended parallel to the median plane of the wheel to form a circumferential wing 26. The wing 26 slides in contact with one of the friction rings 11. The spoke forming parts 24 are prolonged laterally to form a doubled extension 27. The extension 27 rests against the ledge 25. The parts 27 and 25 are supplied with flanges 28 united by bolts 29. The extension 27 is prolonged parallel to the median plane of the wheel to form a circumferential wing 30. The wing 30 slides in contact with the other of the friction rings 11. Bolts 31 pass through the wings 30 and 26. Tubular spacers 33 are mounted on the bolts 31 between the wings 30 and 26. The spacers 33 pass through and support a first ring 32. Rollers 34 are journaled on the spacers 33. The rollers 34 lie between the sides of the ring 32 and the wings 26 and 30. The rollers 34 are disposed in the notches 17 of the rockers 14 and are adapted to coact with the edges of the notches.

The numeral 35 denotes an inner or second ring. An outer or third ring is shown at 36. The rings 35 and 36 have parti-circumferential ribs 37 adapted to be interengaged when a relative movement between the rings 35 and 36 takes place in assembling the structure. The ribs 37 coöperate, as shown in Fig. 2, to hold the rings 35 and 36 from moving outwardly in opposite directions. The inner ring 35 has extensions 38. The extensions 38 are mounted on the bolts 7. The ring 36 has extensions 39. The extensions 39 are mounted on the bolts 7. The bolts 7 carry spacers 40 disposed between the extensions 38 and 39. A resilient buffer 41 is interposed between the ring 32 and the ring 36. A resilient buffer 42 is interposed between the ring 35 and the extension 27. The buffers preferably are of annular form.

The ring 32 is connected with the hub 18 of the wheel by means of the wings 26 and 30. The ring 36 is connected with the rim 4 of the wheel by means of the extensions 39. Therefore, when the hub 18 moves downwardly, the buffer 41 will be compressed between the parts 36 and 32 at the top of the wheel. The ring 35 is connected by the extensions 38 with the rim 4, the part 27 being connected with the hub 18 of the wheel. Therefore, at the bottom of the wheel, the buffer 42 will be compressed between the parts 27 and 35 when the hub 18 moves downwardly.

When the wheel is rotated in one direction, the rollers 34 will engage one of the walls of the notches 17 in the rocker 14 and tilt the rocker. When the wheel is rotated in the opposite direction, the opposite edges of the notches 17 will be engaged by the rollers 34, and the rocker 14 will be tilted, the rocker swinging on the bolts 12. When the rocker tilts, the blocks 15 will be compressed and an additional yielding support for the tire 1 and the rim 4 will be afforded.

Having thus described the invention, what is claimed is:—

1. In a device of the class described, a pair of spoke forming members, one of which is provided with a transverse extension, the spoke forming members having parallel wings; a tire structure; guards overlapped slidably on the wings and carried by the tire structure; first and second rings, and a third ring disposed between the first and second rings, the second and third rings having outward extensions; securing devices carried by the tire structure and engaging the extensions; securing devices mounted in the wings and supporting the first ring; an annular buffer interposed between the first and third rings; and an annular buffer interposed between the second ring and the extension of the spoke member.

2. A device constructed in accordance with claim 1, in combination with rockers pivotally mounted on the tire structure; resilient members at the ends of the rockers and coacting with the tire structure; and rollers carried by the securing devices which coact with the extensions, the rockers having recesses wherein the rollers are received.

In testimony that I claim the foregoing as my own, I have hereto affixed my signature in the presence of two witnesses.

CHARL SJÖGREN.

Witnesses:
  CHAS. R. HATCH,
  E. E. DYKEMAN.